United States Patent [19]

Nakamura

[11] Patent Number: 5,166,837
[45] Date of Patent: Nov. 24, 1992

[54] MAGNETIC DISC REGENERATING CIRCUIT
[75] Inventor: Norio Nakamura, Kanagawa, Japan
[73] Assignee: Kabushiki Kaisha Toshiba, Kawasaki, Japan
[21] Appl. No.: 615,907
[22] Filed: Nov. 20, 1990
[51] Int. Cl.⁵ .............................................. G11B 5/09
[52] U.S. Cl. ........................................ 360/46; 360/51
[58] Field of Search ..................... 360/46, 51, 65, 67

[56] References Cited
U.S. PATENT DOCUMENTS
4,479,152 10/1984 Chi ......................................... 360/46
4,564,869 1/1986 Baumeister .............................. 360/46

OTHER PUBLICATIONS
T. Kameyama, S. Takanami and R. Arai, "*Improvement Of Recording Density By Means Of Cosine Equalizer*", IEEE Transactions on Magnetics, vol. MAG-12, No. 6, Nov. 1976.

*Primary Examiner*—Vincent P. Canney
*Attorney, Agent, or Firm*—Limbach & Limbach

[57] ABSTRACT

A regenerating circuit is disclosed for use in a magnetic disc apparatus which uses a recording system to keep line density of each track in the recording media uniformly in each track. A low pass filter having a fixed cutoff frequency is used in combination with a wave equalization circuit in which time delay and gain are selected to provide a response which when combined with the response of the low pass filter results in an appropriate overall response for the zone from which the information to be processed originates.

9 Claims, 5 Drawing Sheets

MAGNETIC DISC REGENERATING CIRCUIT

TECHNICAL FIELD

The present invention is directed generally to magnetic recording circuitry and more particularly to a regenerating circuit for reading information stored in magnetic media.

BACKGROUND OF THE INVENTION

In conventional magnetic disc apparatus, information is recorded in concentric tracks. The line recording density is low in the tracks located on or near the periphery of the recording media because data is recorded on all tracks at an identical recording frequency with the recording media turning at the fixed speed. In tracks located on or near the periphery this results in an increase in the minimum interval of recording media occupied by a unit of information. Therefore, the recording capacity per unit area of media is lower and the efficiency of the recording density is lower along these outer tracks.

Recently, attempts have been made to improve recording density by using a Zone Bit Recording (ZBR) system to equalize the line density in each track. In such a system, tracks in the media are organized in a plurality of zones and the line recording density in all zones is made uniform. The line recording density in the tracks at the periphery is thus the same as in the interior tracks. This is achieved by recording the data in a particular zone using a frequency which will cause the line recording density to be the same as in tracks in other zones. However, a ZBR system has several disadvantages.

Typically, information is read from the disc using a peak detection/differentiation scheme. However, shifts in the position of the peaks often occur due to interference from adjacent peaks and low signal to noise ratios. A regeneration circuit is typically used to counteract such interference.

In a ZBR system, the bandwidth of the frequency of the signal to be regenerated differs in each zone corresponding to the difference in the recording frequency used to record the data in the particular zone. It is necessary to optimize the regeneration by changing the characteristics of the regenerating circuit for each zone in order to maintain the reliability of the data. A conventional approach is to provide a separate regeneration circuit for each zone. However, the limited space in a typical compact magnetic disc apparatus does not permit an substantial increase in the number of circuit elements.

SUMMARY OF THE INVENTION

These and other problems and disadvantages of previous regeneration circuitry are overcome by the present invention of a regenerating circuit for use in reading information stored on magnetic media in a plurality of zones, in which the information is stored in each of the plurality of zones at different frequencies, and read from a particular one of the plurality of zones which has been designated by a selection signal. The regenerating circuitry comprises low pass filter means for filtering the information being read out with a fixed frequency response characteristic; and cosine equalization which are means responsive to the filtered information and which perform a cosine equalization operation on the filtered information with selectable response characteristics. The response characteristics of the cosine equalization being performed are selected as a function of the zone from which the filtered information is being read out, so that the combination of the frequency response characteristic of the low pass filter means and the response characteristics of the selected cosine equalization provide an overall response characteristic which is particularly adapted for the zone being read.

More specifically, in accordance with the present invention, an analog signal is read from the magnetic media by a magnetic head and transmitted to an input terminal of a low pass filter. The output of the low pass filter is transmitted through an amplifier, for impedance conversion, and through a resistor for impedance matching, to an input terminal of a delay line having a plurality of intermediate terminals which provide smaller delays than at the output terminal of the delay line. One signal is selected from the intermediate terminals by a selecting circuit connected to the intermediate terminals and transmitted with a selected gain to the input terminal of a differential amplifier. The output of the delay line is connected to the other input of the differential amplifier. The combination of delay line, gain, and difference amplifier provides a cosine equalization function. The gain and delay are selected so that, for the particular zone from which the information being processed originates, the combined response of the low pass filter and the equalizer is optimized for that zone.

OBJECTS OF THE INVENTION

It is therefore an object of the invention to provide a magnetic disc regenerating circuit suitable for compact magnetic disc apparatus in which the above-mentioned disadvantages are overcome with a simple circuit arrangement.

It is another object of the invention to provide a magnetic disc regeneration circuit which can accommodate the change from zone to zone of information being read, with a minimum of circuit elements.

These and other objectives, features and advantages of the present invention will be more readily understood upon consideration of the following detailed description and accompanying drawings.

BRIEF DESCRIPTION OF THE DRAWINGS

FIG. 2b illustrates a set of waveforms which occur at the indicated points within the cosine equalization device of FIG. 2a.

DETAILED DESCRIPTION OF THE INVENTION

Figure 1:
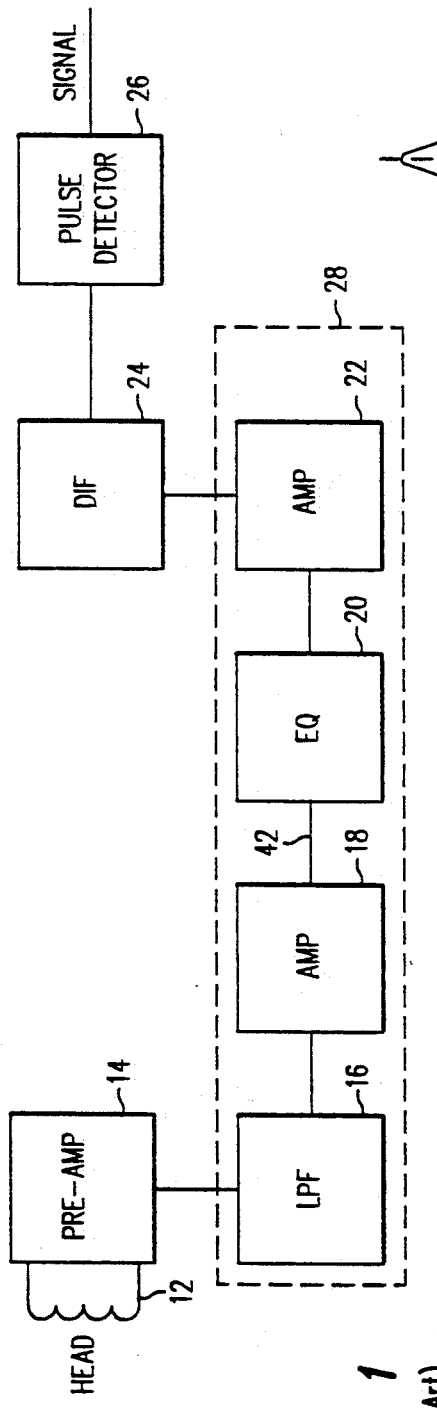
FIG. 1 illustrates the general conventional configuration of a peak detection circuit used in a magnetic disc apparatus.

In general, peak detection in a magnetic disc apparatus is performed by differentiating an analog signal which has been read out by a magnetic head and by detecting the zero crossing points of the differentiated signal. FIG. 1 shows a conventional peak detecting circuit 10 for the case where the signal being detected falls within one band-width of frequency. The peak detecting circuit 10 is constructed of the following elements.

A pre-amplifier 14 amplifies a regenerating signal obtained by a magnetic head 12 from the magnetic media, not shown. A low pass filter 16 removes high frequency noise included in the output signal of the preamplifier 14. An amplifier 18 amplifies the output signal of the low pass filter 16 and passes the signal to a wave equalizer 20. The wave equalizer 20 corrects for peak shift in the signal caused by wave interference with adjacent bits. An amplifier 22 amplifies the output signal of the wave equalizer 20, and differentiator 24 differentiates the signal out of amplifier 22 to produce zero crossings. Pulse detector 26 produces a pulse train corresponding to the zero crossing points in the differentiated signals from differentiator 24.

Figure 3:
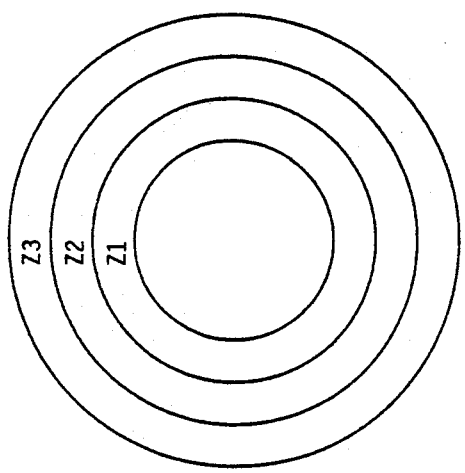
FIG. 3 illustrates the zoning which might be present in a ZBR system formatted magnetic disc.

As explained the above, the recording density per unit surface of the media can be increased by using a uniform line density within the tracks formed on the media. This would be one method to increase the storage capacity of the magnetic disc apparatus. At this time, it is generally true that the media is rotated at a fixed number of revolutions per minute and the recording frequency is changed depending upon the zone in which the information is being recorded. For example, FIG. 3 illustrates the case where the tracks are divided into zones Z1, Z2, and Z3 from the internal track to the peripheral track, respectively. Data is recorded using the same recording frequency for tracks within the same zone. In this case, three different recording frequencies are used, where the frequency for the peripheral track is highest, and the frequencies are established in proportion to a radius forming a track of each region. It should therefore be appreciated that the frequency of the regenerating signal is different in each zone and corresponds to the recording frequency used to record data in the particular zone.

Figure 2B:
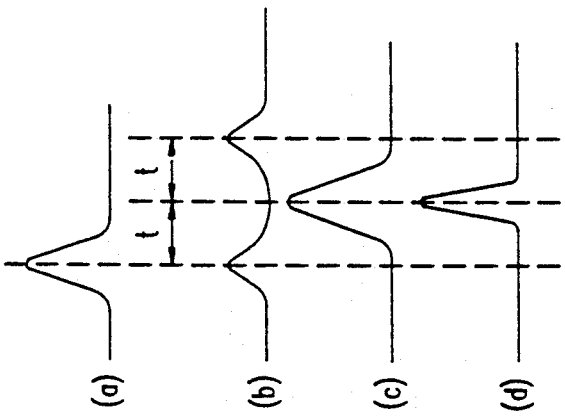
Figure 2A:
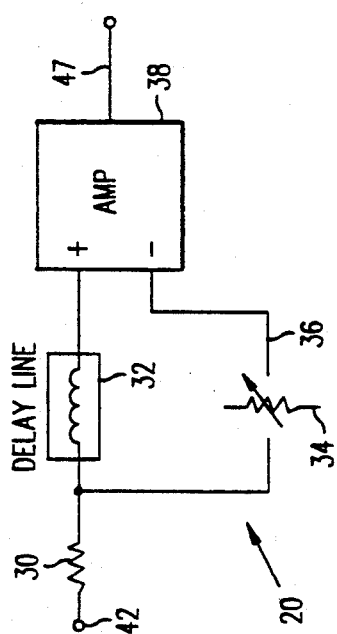
FIG. 2a is a block diagram of a conventional cosine equalization device.

In a magnetic disc apparatus, a major concern is how to correctly regenerate the peaks in the regenerating signal. Pattern peak shift by wave interference with adjacent peaks can occur, and a low signal to noise ratio of regenerating signal can also be a cause of peak shift. FIGS. 2a and 2b illustrate a cosine equalization using a delay line which is used to correct for such pattern peak shifts. The cosine equalization response characteristics and the cutoff frequency of the low pass filter 16 are both varied as a function of the frequency of the regenerating signal to optimize the signal to noise ratio of the regenerating signal.

In the magnetic disc apparatus using ZBR, it is necessary to change the cosine equalization and the parameters of the low pass filter according to the frequency band of each zone.

The present invention is a method and apparatus to optimize the signal to noise ratio of the regenerating signal through the use of a cosine equalization circuit and a single low pass filter. The operating parameters of the cosine equalization are changed as a function of the zone from which the data is being read, and so that the combined responses of the single low pass filter and the changed cosine equalization circuit will provide the optimum signal to noise ratio for that zone.

FIG. 2a shows a block diagram of a conventional cosine equalization device 20. A resistor 30 receives the signal to be equalized and is provided for impedance matching to delay line 32. Delay line 32 has a delay time $\tau$. A resistor 34 provides gain control in a non-delayed circuit path 36. A difference amplifier 38 has high impedance inputs and receives the delayed signal from delay line 32 at its non-inverting input, and the non-delayed signal from signal path 34 at its inverting input.

FIG. 2b illustrates selected waveforms from the equalization circuit of FIG. 2a. When wave (a) is introduced at input terminal 42 (FIG. 2a), wave (b) appears at the junction of resistor 34 and the input to delay line 32 (FIG. 2a), and wave (c), delayed by $\tau$ with respect to the waveform in wave (a), will appear at the output of delay line 32 (FIG. 2a). The double bump of wave (b) is attributable to the initial peak of the applied signal and a reflected peak of the signal which has been delayed by twice the total delay of delay line 32. If the waveforms of waves (b) and (c) are introduced to the difference amplifier 38, wave (d) is obtained. Note that the skirt portion of wave (b) is used to reduce the magnitude of the leading and trailing portions of the peak waveform in wave (c). In turn this decreases the width of the peak to a half-width, which then reduces wave interference by adjacent peaks.

The amplitude characteristics of this cosine equalization is as follows:

$$(1 - K \cos \omega \tau) \qquad [1]$$

where $\tau$=angular frequency, and K=gain.

Figure 6:
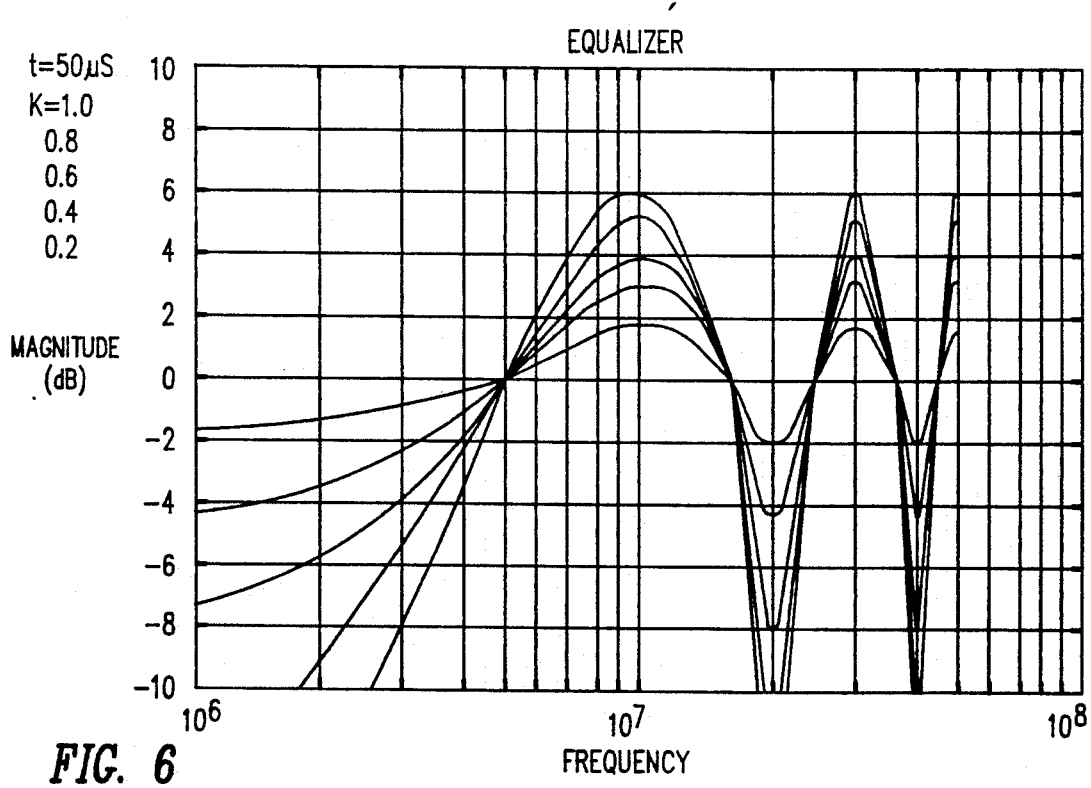
FIG. 6 illustrates how the cosine equalizer response characteristic changes as a function of gain.
Figure 7:
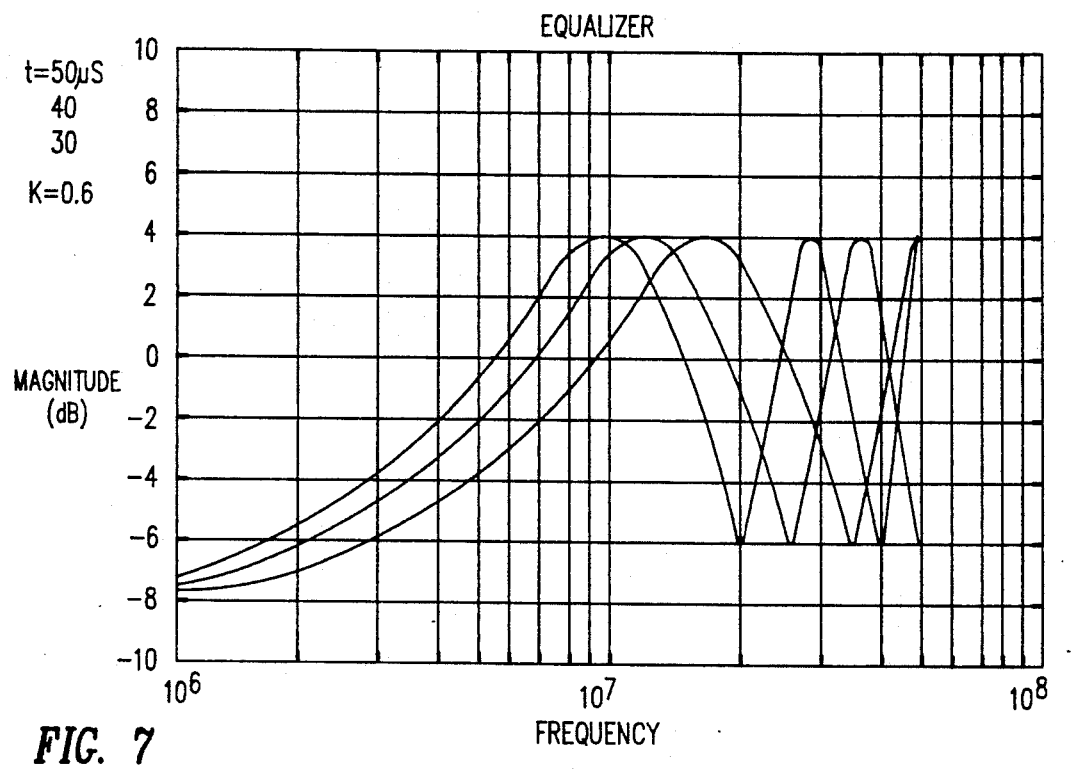
FIG. 7 illustrates how the cosine equalizer response characteristic changes as a function of time delay.

The equalizer characteristics can be changed by selecting the gain K and delay time $\tau$. FIG. 6 shows amplitude characteristics of the cosine equalizer when the delay time $\tau$ is 50 nanoseconds and the gain K is 0.2, 0.4, 0.6, 0.8, or 1.0. FIG. 7 shows amplitude characteristics of the cosine equalizer when the gain K is set a 0.6 and the delay time is varied at 30, 40, or 50 nanoseconds.

The cosine equalization has a peak corresponding to $\omega \tau$ as clearly stated in the equation [1]. From FIG. 7 it can be seen that as $\tau$ is varied the frequency at which the peak of the amplitude characteristic occurs changes. From FIG. 6 it can be seen that as the gain K is varied the amplitude of the characteristic changes without changing the location of the peak.

The peaks following the initial peak of the equalizer amplitude response should be removed because they tend to emphasize any noise present and decrease the signal to noise ratio of the regenerating signal.

Figure 5:
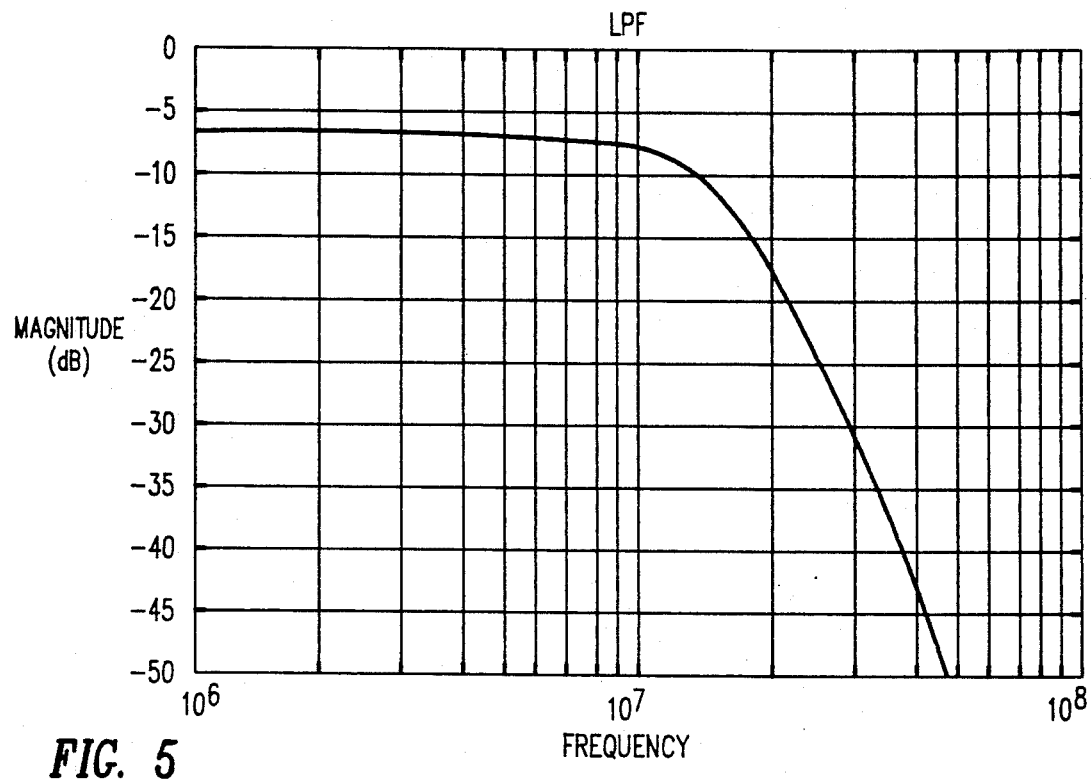
FIG. 5 is one example of a Bessel type low pass filter characteristic which is suitable for use as the fixed low pass filter response characteristic in the present invention.

FIG. 5 shows one example of the frequency characteristics of a Bessel type of low pass filter. The peaks of the cosine equalizer characteristics after the initial peak can be "effectively" removed by combining this low pass filter characteristic with the cosine equalization characteristics. The composite response of such a circuit is shown by way of example in FIG. 9.

According to the present invention, one can obtain performance identical to the conventional regeneration circuits using ZBR but with significantly less space. In accordance with the present invention, a low pass filter having a fixed cutoff frequency is used for filtering the regeneration signal prior to applying it to a wave equalization circuit, and the characteristics of the wave equalization circuit are changed according to the zone from which the information to be regenerated was received.

Figure 10:
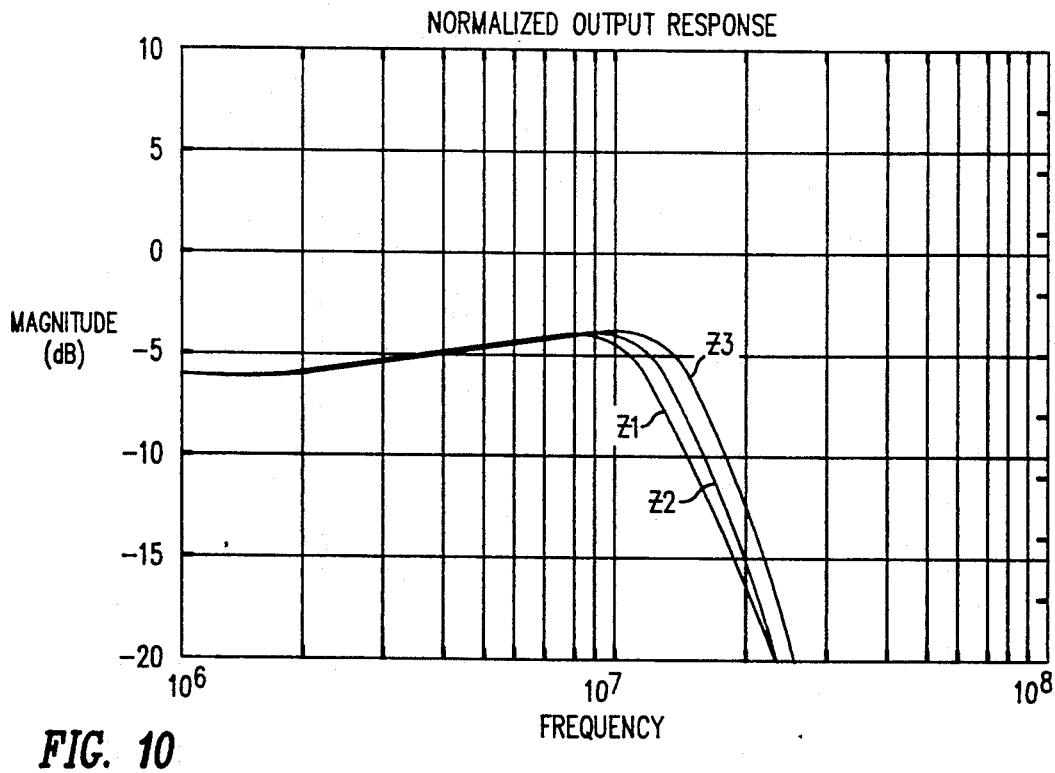
FIG. 10 is an example of a desirable normalized output response of a regeneration circuit built in accordance with the present invention.

FIG. 10 shows the frequency response characteristics of the lowpass filter/wave equalizer combination which are desired for the three regions or zones. The curve having the lowest cutoff frequency corresponds to the signal band of the most inner zone, with the curve having the highest cutoff frequency corresponding to the outer most zone.

In accordance with the present invention, the characteristics of the low pass filter initially are determined as shown in FIG. 5 to provide the characteristics of FIG. 10. The delay time $\tau$ and the gain K of the cosine equalization circuit are then determined so that the characteristics of the combined low pass filter and the cosine equalization are substantially identical to that of FIG. 10.

Figure 8:
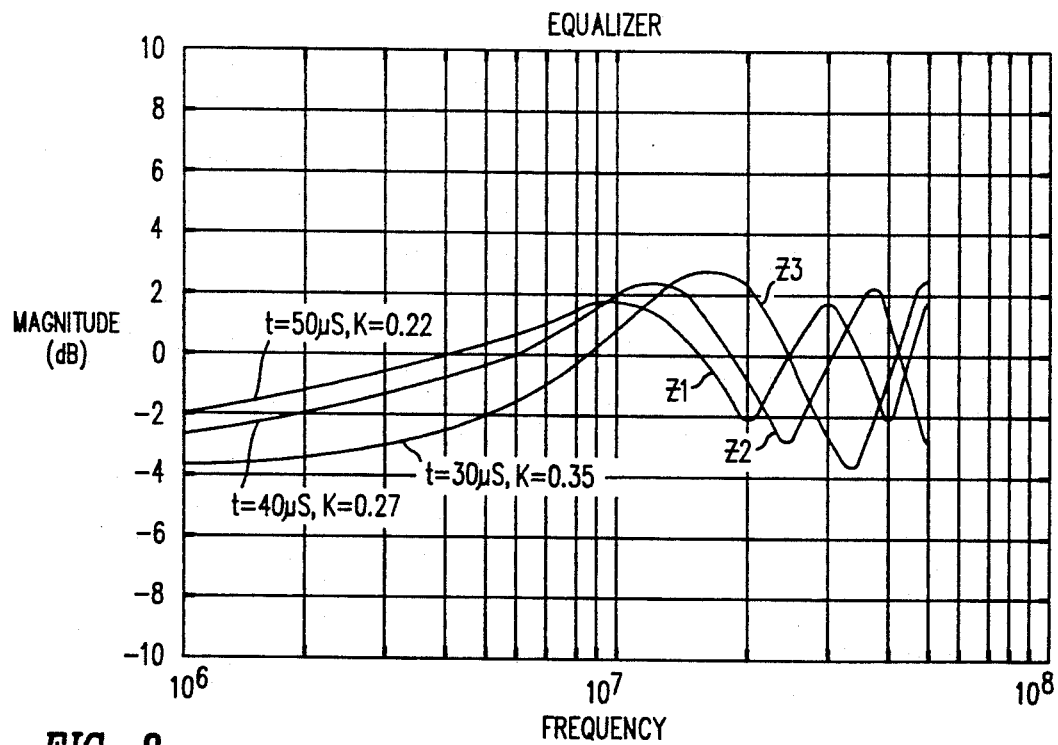
FIG. 8 is an example of cosine equalizer characteristic which are suitable for use in a regeneration circuit of the present invention which accommodates three zones.
Figure 9:
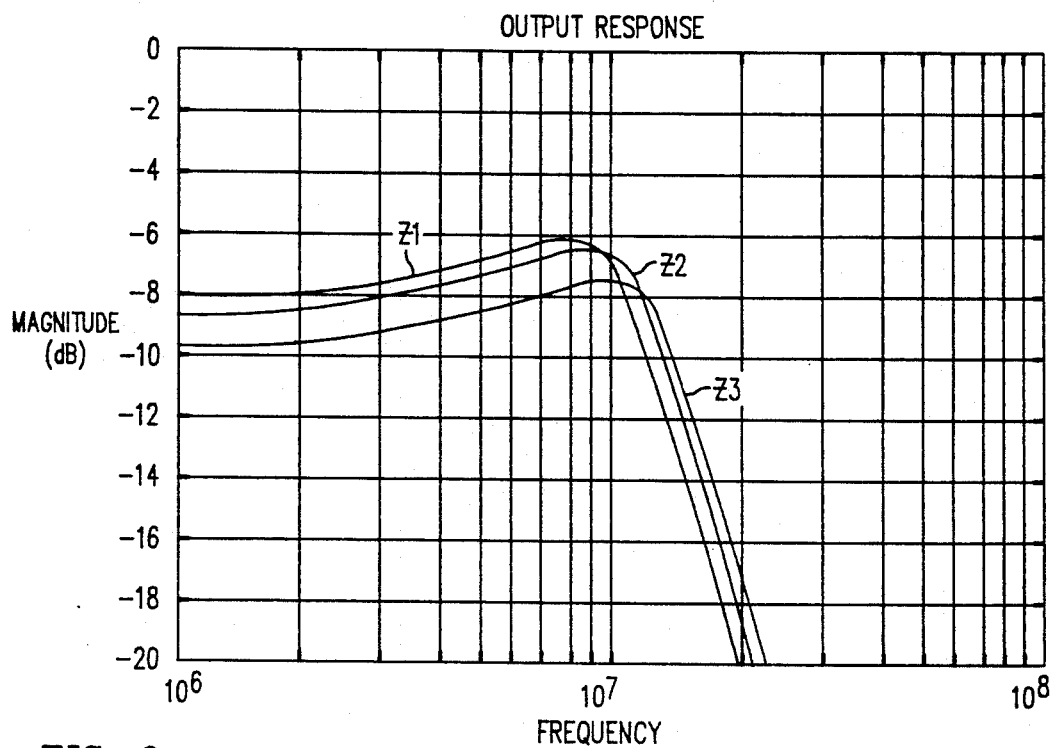
FIG. 9 is an example of a desirable output response of the combined responses of the fixed low pass filter and the cosine equalization circuit in a regeneration circuit built in accordance with the present invention.

FIG. 8 shows the characteristics of the cosine equalization for the time delay/gain pairs of: $\tau=50$ nanosec., $K=0.22$; $\tau=40$ nanosec., $K=0.27$; and $\tau=30$ nanosec., $K=0.35$; for zones Z1, Z2 and Z3, respectively. When these response characteristics are combined with the low pass filter response shown in FIG. 5, the combined response characteristics of FIG. 9 are obtained. The delay time $\tau$ and the gain K will be calculated at the same manner as the above for each region or zone.

Figure 4:
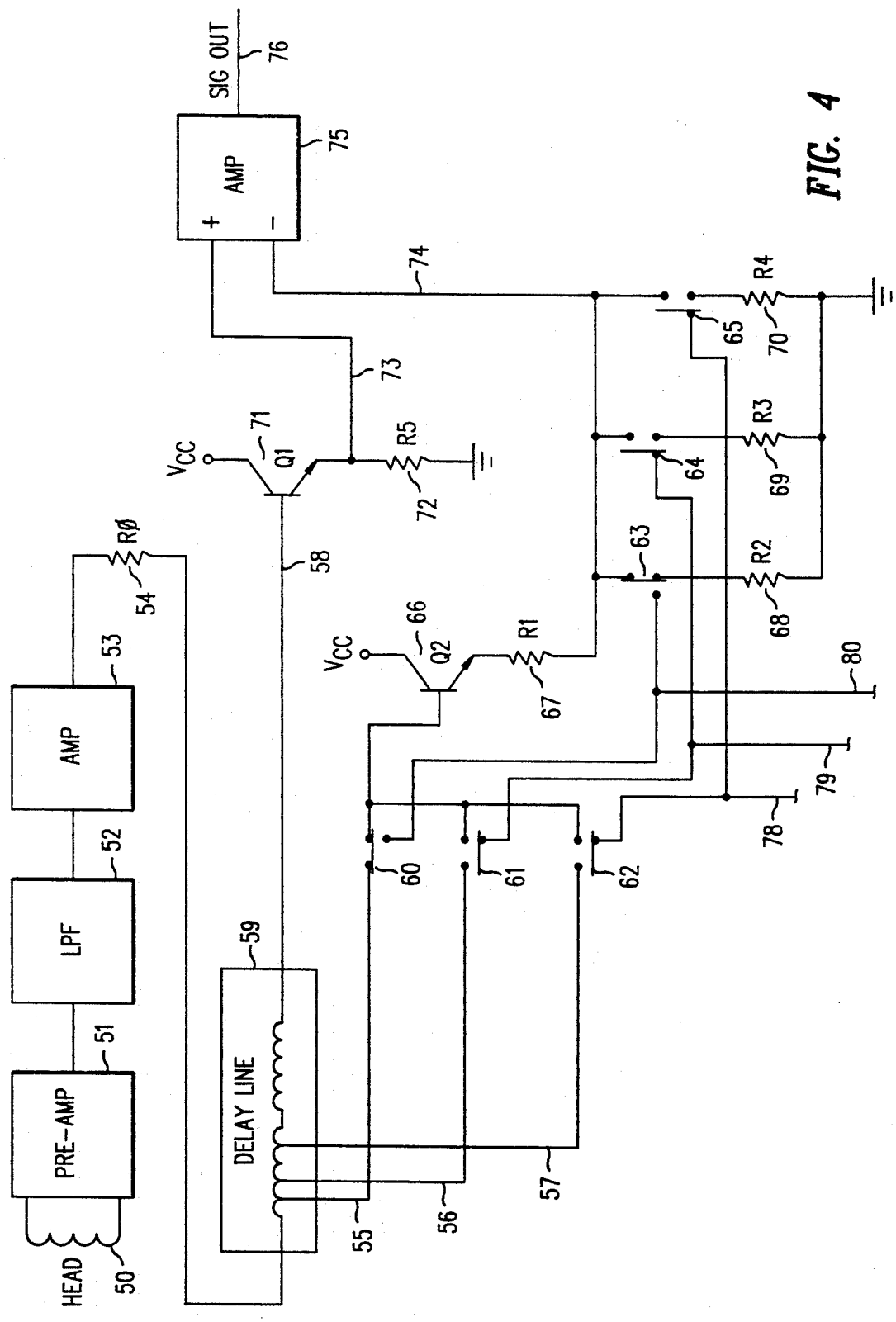
FIG. 4 is a detailed schematic of regeneration circuitry in accordance with the present invention.

FIG. 4 shows a block diagram of an embodiment of the present invention. A regenerating signal is read out from the magnetic media by a magnetic head 50. This signal is amplified by a preamplifier 51. The preamplified regenerating signal is applied to an amplifier 53 through low pass filter 52. The output of amplifier 53 is applied to a delay line 59 through an impedance matching resistor 54. The delay line 59 provides several signals having different delays at output terminal 58 and intermediate terminals 55, 56, and 57. The delayed signal at output terminal 59 is transmitted to the noninverting input terminal of a difference amplifier 75 through an emitter-follower. The emitter-follower employs transistor 71 and resistor 72, connected between the emitter of transistor 71 and circuit ground.

The signals at intermediate terminals 55, 56, and 57 correspond to signals which are delayed by a different times $r_1$, $r_2$, and $r_3$. Recall that the parameters $r_1$, $r_2$, and $r_3$ are the same time delays used in determining the response characteristic of the cosine equalization circuit. The delayed signals are applied to switches 60, 61, and 62 respectively. Another terminal of the switches 60, 61, and 62 is connected in common and to the base electrode of transistor 66 so that signals received from the switches 60, 61, and 62, are amplified by transistor 66. Transistor 66 is used in an emitter-follower configuration.

In this embodiment, one of the switches 60, 61 and 62 is selected by a signal on control terminals 78, 79, and 80.

The emitter of transistor 66 is connected to switches 63, 64, and 65 by way of resistor 67. The junction of resistor 67 and switches 63, 64 and 65 is connected to the inverting input terminal of the difference amplifier 75. The switches 63, 64, and 65 are each connected to the ground, or circuit common, through resistors 68, 69, and 70, respectively, when they are closed. The value of the resistors 68, 69, and 70 will determine a divider ratio in combination with resistor 67. The particular divider ratio provided corresponds to the value desired for the gain K of the cosine equalization, as mentioned above. The control signals for switches 63, 64, and 65 are received from control terminals 78, 79, and 80, respectively. A control signal is applied to the appropriate control terminal as a function of the zone from which the information to be generated is obtained. It is to be noted that a control signal applied at control terminal 78 closes switches 62 and 65; a control signal applied at control terminal 79 closes switches 61 and 64; and a control signal applied at control terminal 80 closes switches 60 and 63. At any time, one of the switches 60 and 63, the switches 61 and 64, or the switches 62 and 65 will be selected and will be in a closed state.

As an example, in operation, when information from zone Z3 is being processed, switches 60 and 63 will be activated so that they are closed. This provides a signal from delay line 59 to intermediate terminal 55, which might be delayed by 30 nanoseconds. See FIG. 8. The closure of switch 63 will place resistor 68 in a series divider with resistor 67 to provide a gain of 0.35. This results in the response characteristic for the equalization circuit of curve Z3, FIG. 8. The combination of this response with that of the low pass filter 52, see FIG. 5, results in the desired overall response of curve Z3 in FIG. 9.

As explained above, the desired optimization of a magnetic disc apparatus using ZBR is obtained by the embodiment of FIG. 1. As can also be appreciated, a regenerating circuit for use in magnetic disc apparatus using ZBR is obtained which uses significantly fewer elements than previous circuits and results in a compact space saving design.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

I claim:

1. A regenerating circuit for use in reading information stored on magnetic media in a plurality of zones, in which the information is stored in each of the plurality of zones at different frequencies, and read from a particular one of the plurality of zones designated by a selection signal, the regenerating circuitry comprising low pass filter means for filtering the information being read out with a predetermined frequency response characteristic;

delay line means for providing a first delayed version of the filtered information with a first delay, and providing plurality of intermediate delayed versions of the filtered information having delays smaller than the first delay;

difference amplifier means for taking the difference between the first delayed version of the filtered information and a second signal; and gain means receiving the plurality of intermediate delayed versions of the filtered information for supplying as the second signal and in response to the selection signal, one of the intermediate delayed versions of the filtered information to the difference amplifier means at a predetermined gain, wherein the time delay and gain of the selected intermediate delayed version of the filtered information and the difference taken by the difference amplifier implement a cosine equalization function, and further wherein the predetermined frequency response of the low pass filter means when combined with the implemented cosine equalization function provide a frequency characteristic which is particularly suited for the zone of the magnetic media being read.

2. The apparatus of claim 1, wherein the delay line means includes a delay line having an output and a plurality of intermediate taps, and further wherein the first delayed version of the filtered information is provided at the output and the plurality of intermediate delayed version of the filtered information are provided at the intermediate taps.

3. The apparatus of claim 1, wherein the gain means include
   means responsive to the selection signal for selecting one of the plurality of intermediate delayed versions of the filtered information; and
   means responsive to the selection signal for amplifying the selected intermediate delayed version of the filtered information with a gain that is determined as a function of the selection signal.

4. The apparatus of claim 3, wherein the amplifying means comprise
   transistor means having a base terminal, a collector terminal, and an emitter terminal, and connected in an emitter follower configuration, for amplifying a signal received at the base terminal;
   fixed resistor means connected to the emitter terminal of the transistor means;
   a plurality of gain-setting resistor means one of which is connected at any particular time to the fixed resistor means for forming a resistive divider for the signal present at the emitter terminal of the transistor means, wherein the gain-setting resistor which is connected at any particular time is selected as a function of the selection signal; and
   further wherein the selecting means comprise
   switch means responsive to the selection signal for supplying one of the plurality of intermediate delayed versions of the filtered signal to the base of the transistor means.

5. A regenerating circuit for use in reading magnetization information recorded on a magnetic disc in different zones comprising:
   a) means for detecting the magnetization information;
   b) low pass filter means connected to the detecting means for filtering the magnetization information with a predetermined frequency response characteristic;
   c) delay line means having an input terminal connected to the low pass filter for delaying the filtered magnetization information and supplying the delayed information at an output terminal with a time delay $\tau_1$, and at a plurality of intermediate terminals with time delays less than $\tau_1$;
   d) gain control means receiving signals from the intermediate terminals of the delay line means for amplifying the received signals with a selected gain and for providing the amplified signals at an output terminal, wherein the selected gain and the intermediate terminal supplying the signal for amplification by the gain control means are selected as a function of the zone from which the magnetization information is being detected by the detecting means; and
   e) differential comparator means having a first input terminal connected to the output terminal of the delay line means and a second input terminal connected to the output terminal of the gain control means, for providing an output which is the difference between the signals applied to the input terminals.

6. The apparatus of claim 5, wherein the delay line means includes resistor means connected to the low pass filter for matching the low pass filter means to the delay line means.

7. The apparatus of claim 6, wherein the gain control means comprise
   first transistor means having a base terminal, a collector terminal, and an emitter terminal, and connected in an emitter follower configuration, for amplifying a signal received at the base terminal and supplying the amplified signal to the differential comparator means;
   fixed resistor means connected to the emitter terminal of the transistor means;
   a plurality of gain-setting resistor means connectible to the fixed resistor means for forming a resistive divider for the signal present at the emitter terminal of the transistor means; and
   switch means responsive to the zone from which the magnetization information is being read for selecting the intermediate terminal of the delay line means which supplies the signal to the base of the transistor means, and for connecting a corresponding one of the gain-setting resistor means to the emitter terminal of the transistor means.

8. The apparatus of claim 7, wherein the delay line means comprise a tapped delay line.

9. The apparatus of claim 7, further including second transistor means having a base terminal, a collector terminal, and an emitter terminal, and wherein the second transistor means are connected between the output terminal of the delay line means and the first input terminal of the differential comparator means in an emitter follower configuration, for amplifying a signal received at the base terminal and supplying the amplified signal to the differential comparator means.

* * * * *